April 8, 1930.     J. J. WITKOWSKI ET AL     1,753,396
STORAGE BATTERY CARRIER
Filed June 12, 1928
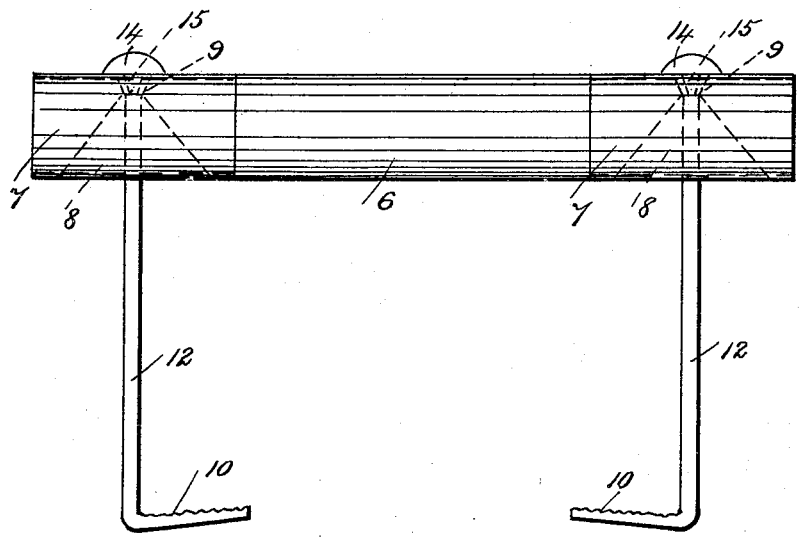
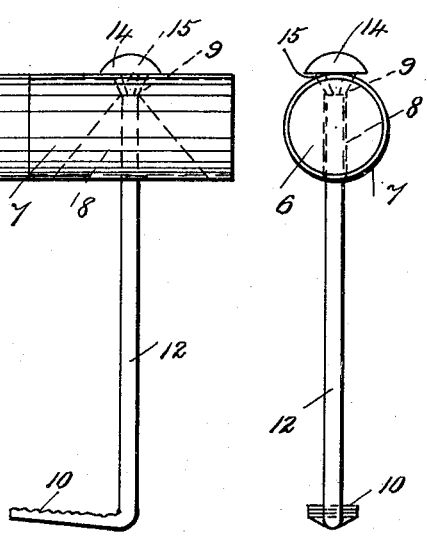
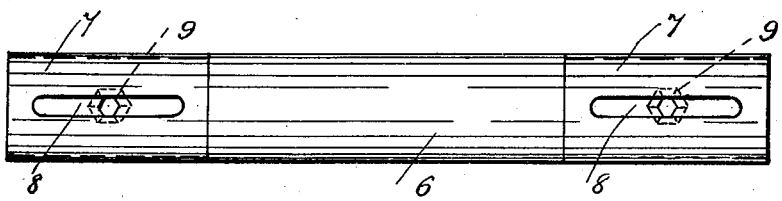
Inventors:
James J. Witkowski
and William L. Leeper
by Herbert W. D'Jamer
Attorney.

Patented Apr. 8, 1930

1,753,396

UNITED STATES PATENT OFFICE

JAMES J. WITKOWSKI AND WILLIAM L. LEEPER, OF ALBION, NEW YORK

STORAGE-BATTERY CARRIER

Application filed June 12, 1928. Serial No. 284,802.

This invention relates to devices for lifting and carrying storage batteries and other similar objects; and it consists of a handle provided with lifting hooks as hereinafter fully described and claimed.

In the drawings, Fig. 1 is a front view of a carrier constructed according to this invention. Fig. 2 is an end view of the same. Fig. 3 is a plan view, from below, of the handle with the hooks removed.

A handle 6 of wood or other similar material is provided, and preferably has ferrules 7 of metal secured over its end portions. Each ferrule and end portion is provided with a longitudinal slot 8 having parallel sides and converging ends. The upper part of this slot has a tapering hexagonal socket 9. Hooks 10 are provided, and have shanks 12 which engage with the slots 8. Each shank has a head 14 at its top which bears on the ferrule and suspends the hook in place. Each shank has also a tapering hexagonal portion 15 which engages with the socket 9.

The hooks have their hooked portions arranged at substantially a right angle to the shanks and are preferably serrated. The shanks are pushed upwardly in the slots so that the hooks can swing freely and rotate, and the hooked portions are slit under the battery to be lifted. The handle is then raised so that the hexagonal parts engage with the sockets and prevent the hooks from rotating, and thereby prevent them from letting go of the battery or other object resting on them. The socket 9 and the part 15 operate as clutch members to prevent the rotation of the shank 12 while the head 14 is resting on the handle.

What we claim is:

1. A carrier, comprising a handle having a longitudinal slot in one end portion, said slot being open at its bottom and having a clutch socket at its top, a hook provided with a shank which is slidable vertically in the said slot and which has a head which suspends the hook from the handle, said shank having also a projecting clutch portion which normally engages with the said socket and prevents the hook from rotating while the head is resting on the handle, said shank being rotatable in said slot when said clutch portion is disengaged from said socket and a hook suspended from the other end portion of the handle.

2. A carrier as set forth in claim 1, the said longitudinal slot having converging ends which are inclined upwardly to the said socket.

3. A carrier as set forth in claim 1, the said socket being hexagonal and tapering with its larger end uppermost, and the projecting portion of the shank being shaped to fit the socket.

In testimony whereof we affix our signatures.

JAMES J. WITKOWSKI.
WILLIAM L. LEEPER.